Oct. 10, 1944.  S. MINNECI  2,360,148

ELECTRIC CIRCUIT

Filed Dec. 14, 1942

Inventor:
Salvatore Minneci,
by Harry E. Dunham
His Attorney.

Patented Oct. 10, 1944

2,360,148

UNITED STATES PATENT OFFICE 2,360,148

ELECTRIC CIRCUIT

Salvatore Minneci, Pittsfield, Mass., assignor to General Electric Company, a corporation of New York Application December 14, 1942, Serial No. 468,939

6 Claims. (Cl. 171—119)

This invention relates to electric circuits and more particularly to improvements in electroresponsive circuits.

An example of an electroresponsive circuit is the primary control circuit of an automatic voltage regulator. Many such circuits are single-phase circuits, although the main circuit whose voltage is to be regulated is a polyphase circuit. In order to obtain proper response during unbalanced voltage conditions on the polyphase circuit, and in order to provide correct line drop compensation, and for other reasons, such voltage regulator control circuits sometimes become relatively complicated.

In accordance with the present invention there is provided a novel and simple circuit of the above character. This circuit utilizes a symmetrical phase sequence component segregating network of simple form in such a manner that it, in effect, also becomes a phase shifter so that direct line drop compensation can be obtained with but a single current transformer connected in one of the lines of the main regulated circuit.

An object of the invention is to provide a new and improved electric circuit.

Another object of the invention is to provide a new and improved electroresponsive circuit.

A further object of the invention is to provide a new and improved voltage regulator control circuit.

The invention will be better understood from the following description taken in connection with the accompanying drawing and its scope will be pointed out in the appended claims.

Figure 1:
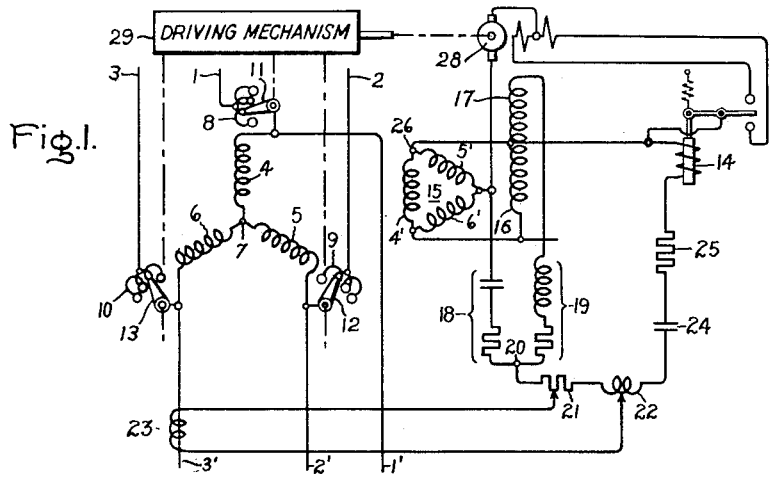
Figure 2:
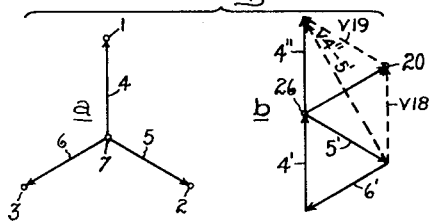
Figure 3:
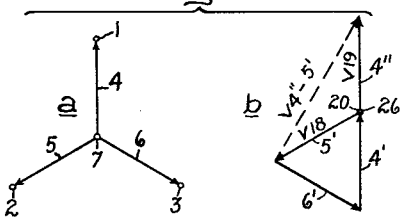
Figure 4:
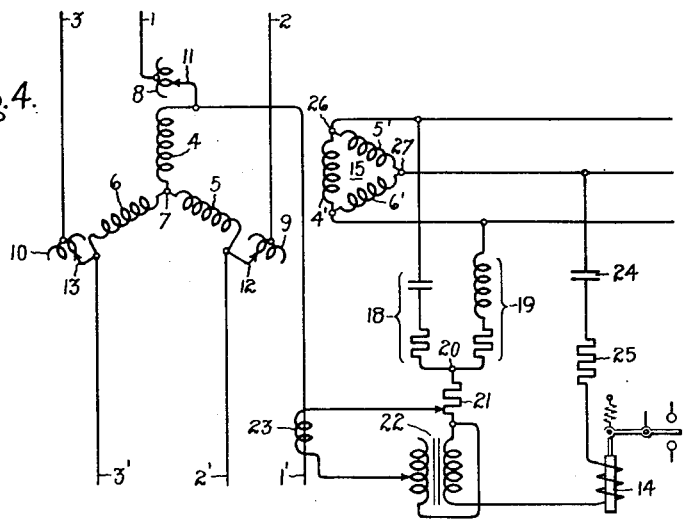
Figure 5:
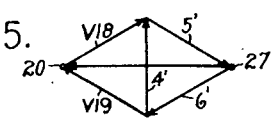

In the drawing Fig. 1 illustrates diagrammatically an embodiment of the invention; Fig. 2 illustrates the vector relations with respect to the positive phase sequence voltage in Fig. 1; Fig. 3 illustrates the vector relations of the negative phase sequence voltage in Fig. 1; Fig. 4 is a modification; and Fig. 5 is a vector diagram of the voltages in Fig. 4.

Referring now to the drawing and more particularly to Fig. 1, there is shown therein a main three-phase circuit having conductors 1, 2 and 3. Connected in this circuit is a voltage regulator shown by way of example as an auto-transformer type step voltage regulator having a Y- or star-connected exciting winding consisting of the three phase windings 4, 5 and 6 connected together at a neutral point 7 and a series winding consisting of the three phase windings 8, 9 and 10 serially connected in the lines 1, 2 and 3. These lines are preferably connected to the mid-points of the phases of the series winding and the free terminals of the exciting winding are connected selectively to symmetrical intermediate points or taps of the series winding by means of ratio adjusters 11, 12 and 13. In this manner the regulator may be made to boost or buck the voltage of the circuit as desired.

For supplying current for the regulator auxiliaries, such as the usual motor 28 for driving the ratio adjusting mechanism shown schematically at 29, and for energizing the primary control relay, such as a contact making voltmeter 14, there is provided a tertiary delta winding 15 having phase windings 4', 5' and 6'.

For insuring proper response of the relay 14 under unbalanced voltage conditions as well as under balanced voltage conditions on the main circuit, there is provided a special phase sequence segregating network comprising a one-to-one ratio single-phase transformer having a primary winding 16 connected across phase winding 4' of the delta winding and having one terminal of its secondary winding 17 connected to one terminal of its primary winding. As shown, this common terminal is the corner of the delta to which the phase windings 4' and 5' are connected. The remaining elements of the network comprise a capacitor-resistor branch 18 and an inductor-resistor branch 19 connected in series circuit relation with each other between the free terminal of the secondary winding 17 of the single-phase transformer and the corner of the delta formed by the phase windings 5' and 6'. The operating element of the relay 14 is connected between the common terminal of the windings 16 and 17 and the common terminal of the capacitor and reactor, which latter terminal is shown as the point 20.

For compensating the voltage relay for the voltage drop in the main circuit there is provided a line drop compensator shown diagrammatically as a resistor 21 and a reactor 22 connected in series with the voltage relay. Through adjustable portions of these elements is circulated a current supplied by a current transformer 23 connected in line 3' of the main circuit.

For best operation it may sometimes be desirable to neutralize the inductance of the voltage relay branch of the circuit and for this purpose a compensating series capacitor 24 may be employed. It may also be desirable to have the resistance of the voltage relay branch of the circuit a particular value and for this purpose a series resistor 25 may be employed.

It will be observed that the single-phase transformer is in the form of a two-to-one ratio autotransformer and such a device may therefore equally well be used.

It should be understood that the voltage relay is adjusted so that it is balanced in substantially its neutral or mid position when the voltage to be regulated is normal and that if this voltage departs from normal in either direction one or the other of the sets of contacts of the relay will close. These contacts will normally control auxiliary circuits for operating any suitable servo mechanism for operating the ratio adjusters of the regulator and as mechanisms of this type are well known, it is believed unnecessary to show the details of any particular mechanism.

The operation of Fig. 1 is as follows: Fig. 2a shows the vector voltages of the windings 4, 5 and 6 which are the same as the line-to-neutral voltages of the main circuit, 1, 2 and 3, and it is assumed that the positive phase sequence is 1, 2, 3, this corresponding to the conventional counterclockwise vector rotation. Accordingly, the phase voltages of the tertiary winding 15 form the vector triangle 4', 5', 6' in Fig. 2b. The voltage of the secondary winding 17 of the single-phase transformer is the same in magnitude and direction as the voltage 4' and is indicated by the vector 4'' in Fig. 2b. The difference between the voltage of the secondary winding of the single-phase transformer and the voltage of phase winding 5' is the voltage $V_{4''-5'}$ and as the capacitive impedance 18 and the inductive impedance 19 are connected across this voltage, the sum of the voltages across these devices must equal that voltage. The voltages of these devices are indicated by $V_{19}$ for the inductive element, and $V_{18}$ for the capacitive element, and the voltage of point 20 is indicated in the diagram. The voltage impressed on the voltage relay circuit is therefore the difference between the voltage of point 20 and the voltage of point 26, this being the junction of the voltages 4', 5' and 4''.

The reactive and resistive components 18 and 19 are equal to each other and are also so proportioned to the impedance of the voltage relay branch of the circuit that the triangles consisting, on the one hand, of the vectors $V_{4''-5'}$, 5' and 4'' and, on the other hand, of the vectors $V_{4''-5'}$, $V_{18}$ and $V_{19}$ are congruent.

The negative phase sequence voltage of the system is shown in Fig. 3, Fig. 3a showing that the negative phase sequence is 1, 3, 2. With this negative phase sequence the vector triangle of the tertiary winding is, in effect, turned over 180 degrees, that is to say, it is rotated about the vector 4' which, it will be observed, does not change the phase of the voltage of the line 1. However, the phase relation between the voltage $V_{4''-5'}$ and the voltages $V_{18}$ and $V_{19}$ does not change with the result that the points 20 and 26 coincide with each other and consequently there is no voltage difference between these points. It will therefore be seen that the voltage on the circuit of the primary relay is independent of the negative phase sequence voltage, which voltage is a measure of the unbalance of the circuit and that the voltage relay is response only to the positive sequence component of the voltage of the main circuit.

As the voltages 4'' and 5' make 120 degrees with each other and as the voltages $V_{18}$ and $V_{19}$ are equal, the voltage between the points 20 and 26 bisects the 120 degree angle and makes a 60 degree angle with the voltage 5'. As the phase voltage 6' also makes a 60 degree angle with the voltage 5', the voltages 6' and 20—26 are in phase with each other. This means that with unity power factor on the main power circuit the current in the line 3' will be in phase with the output voltage of the network and in phase with the voltage impressed on the voltage relay so that the output current of the single current transformer 23 when circulated in the line drop compensator will produce correct line drop compensation.

In the modification shown in Fig. 4 the single-phase transformer 16—17 has been eliminated and the impedance 18 and impedance 19 are connected in series across the phase winding 4' of the tertiary winding. The voltage relay branch of the circuit is connected to the point 27, this being the junction of the phase windings 5' and 6'.

The current transformer 23 has been connected in the line 1' and the reactance element 22 of the line drop compensator is in the form of a reactance transformer which is so connected that the voltage it introduces in the voltage relay circuit is reversed. Furthermore, the labels on the line drop compensator elements are reversed so that what is actually the rheostat or resistive element becomes the reactance compensating element of the compensator and what is actually the reactive element or portion of the compensator becomes the resistance compensating element of the compensator.

Fig. 5 shows the vector relations existing in Fig. 4. The triangles 4', 5', 6' and 4', $V_{18}$, $V_{19}$ are congruent and for the positive phase sequence the individual vectors have the directions shown in Fig. 5 so that the voltage between the points 20 and 27 is a voltage proportional to the positive phase sequence voltage of the system and is the voltage impressed on the voltage relay branch of the electroresponsive circuit. For the negative phase sequence the triangle 4', 5', 6' reverses in the manner shown in Figs. 2 and 3 so that point 27 coincides with point 20 and the voltage difference between these points becomes zero.

It will be observed from Fig. 5 that the voltage between points 20 and 27 is in quadrature with the voltage of the phase 4' of the tertiary winding and therefore is in quadrature with the line-to-neutral voltage of the winding 4 or of the lines 1 and 1' of the main circuit. Therefore, as the current transformer 23 is connected in the line 1' the current which it will circulate through the line drop compensator at unity power factor on the main circuit will be in quadrature with the voltage impressed on the voltage relay. It is for this reason that the voltage of the element 22 of the compensator is reversed and that the labels on the compensator elements are interchanged. These latter features of quadrature energization, reversal of the labels and reversal of the reactance element of the compensator form the subject matter of Patent 2,068,576 St. Palley which is assigned to the assignee of the present application.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a polyphase circuit, an automatic voltage regulator therefor having a calibrated single-phase voltage sensitive primary control device, a phase sequence segregating network for energizing said device with a single-phase voltage which is proportional to the symmetrical positive phase sequence voltage of said circuit, a line drop compensator for said device, and a single current transformer connected in one of the phases of said circuit for providing said line drop compensator with its total energization.

2. In combination, a polyphase circuit, an automatic voltage regulator therefor having a calibrated single phase voltage sensitive primary control device, a phase sequence segregating network connected between said circuit and said device for energizing it with a single phase voltage which is proportional to the symmetrical positive phase sequence voltage of said circuit, a line drop compensator connected in circuit with said device, and a single current transformer connected in one of the phases of said circuit for providing said line drop compensator with its total energization.

3. In combination, a Y-connected step voltage regulator having a delta connected tertiary winding, a primary voltage relay for controlling said regulator, a phase sequence segregating network connected between said delta winding and said relay for energizing the latter in accordance with the positive phase sequence voltage of said regulator, a line drop compensator connected in circuit with said relay, and a single current transformer connected in series with one of the phases of said regulator for supplying said line drop compensator with all of its energization at the proper phase angle to produce correct line drop compensation.

4. In combination, a polyphase circuit, an automatic voltage regulator therefor having a single-phase voltage responsive primary control device, a network for energizing said device with a voltage which is proportional to the symmetrical positive phase sequence component of the voltage of said circuit, said energizing voltage being in phase with one of the line-to-neutral voltages of said circuit, line drop compensating means for said device, and means for energizing said compensating means entirely from the current in said line.

5. In combination, a polyphase circuit, an automatic voltage regulator therefor having a single-phase voltage responsive primary control device, a network for energizing said device with a voltage which is proportional to the symmetrical positive phase sequence component of the voltage of said circuit, said energizing voltage being in quadrature with one of the line-to-neutral voltages of said circuit, line drop compensating means for said device, and means for energizing said compensating means entirely from the current in said line.

6. In combination, a transformer having Y and delta connected windings, a one-to-one ratio transformer having its primary winding connected across one of the phases of said delta winding, a terminal of the secondary winding of said single-phase transformer being connected to a terminal of its primary winding, a capacitor and a reactor connected in series with each other between the remaining corner of said delta and the remaining terminal of the secondary winding of said single phase transformer, and an electroresponsive device connected between the common terminal of the windings of said single-phase transformer and the common terminal of said capacitor and reactor.

SALVATORE MINNECI.